July 26, 1960
D. A. KEMPER
2,946,219
CONTINUOUSLY INDICATING TORQUE AND HORSEPOWER DEVICE
Filed June 11, 1954
3 Sheets-Sheet 1
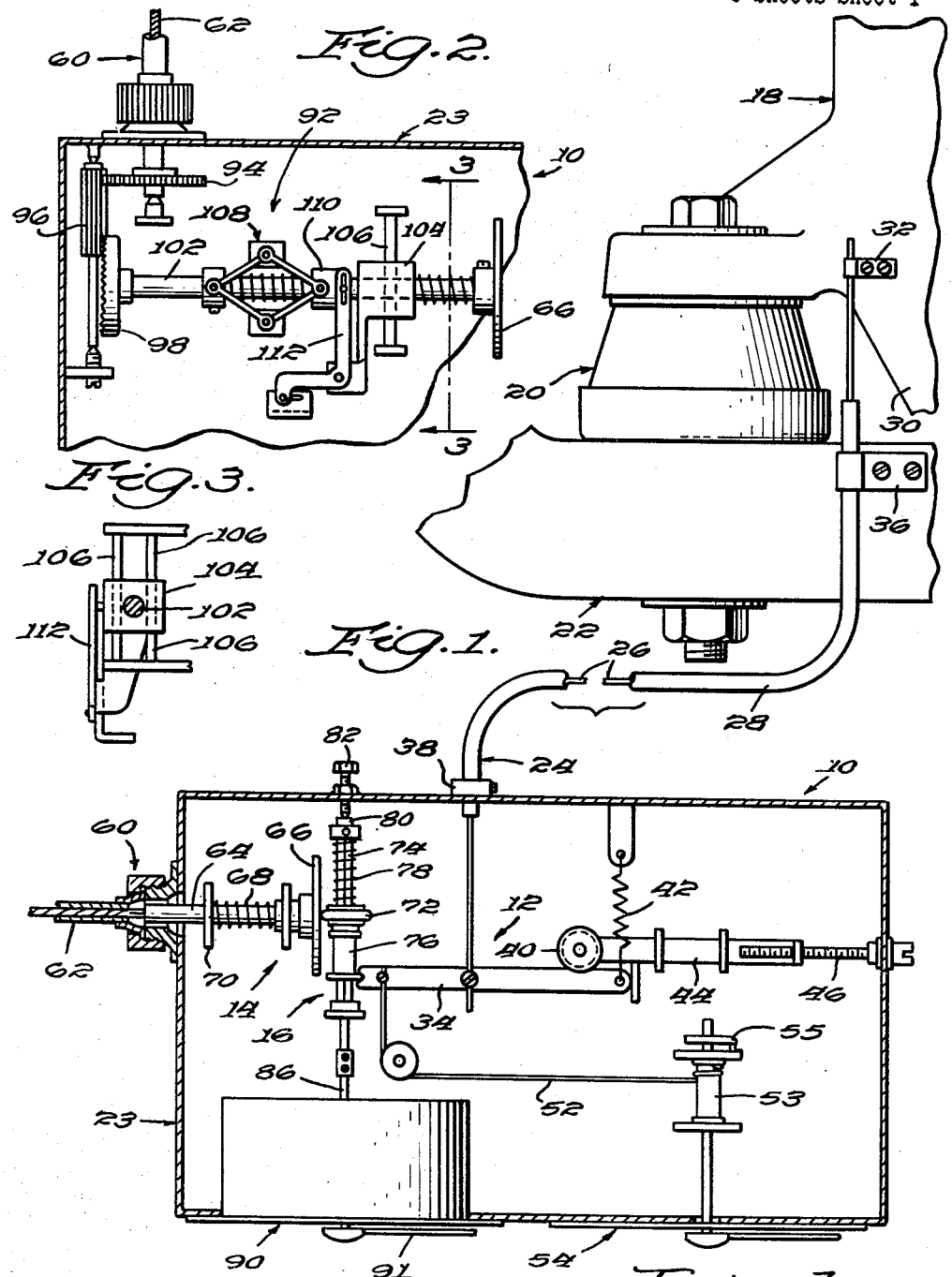
Inventor:
David A. Kemper.
By Thomas P. Mahoney.
Atty.

July 26, 1960 D. A. KEMPER 2,946,219
CONTINUOUSLY INDICATING TORQUE AND HORSEPOWER DEVICE
Filed June 11, 1954 3 Sheets-Sheet 2
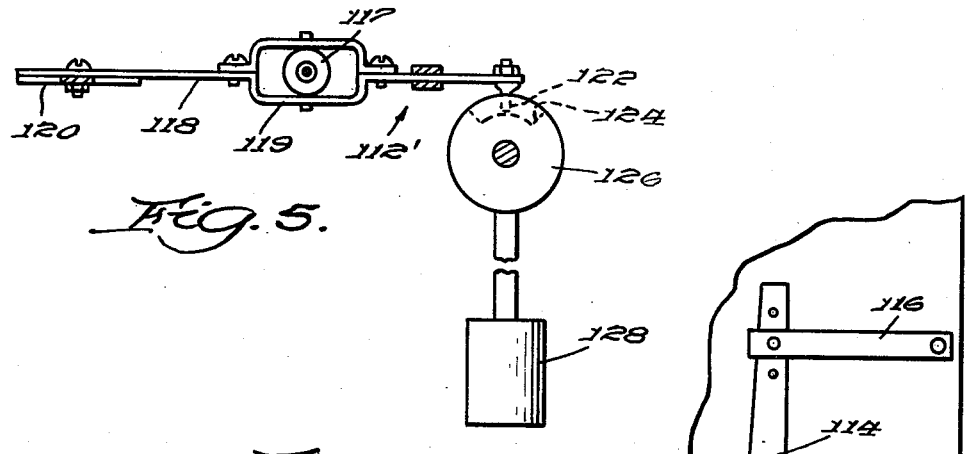
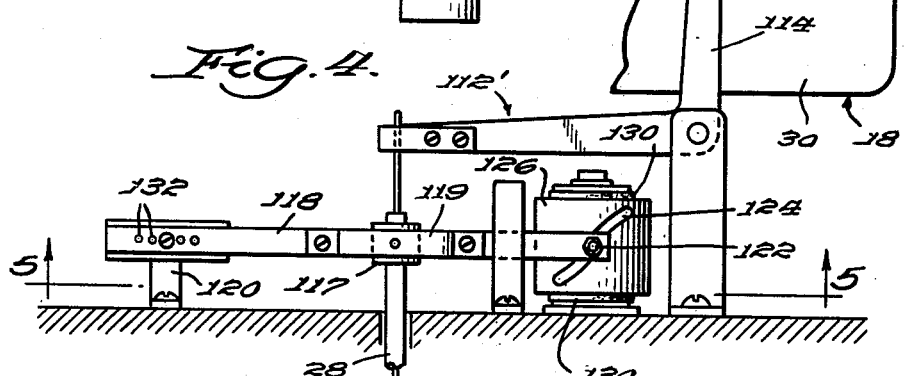
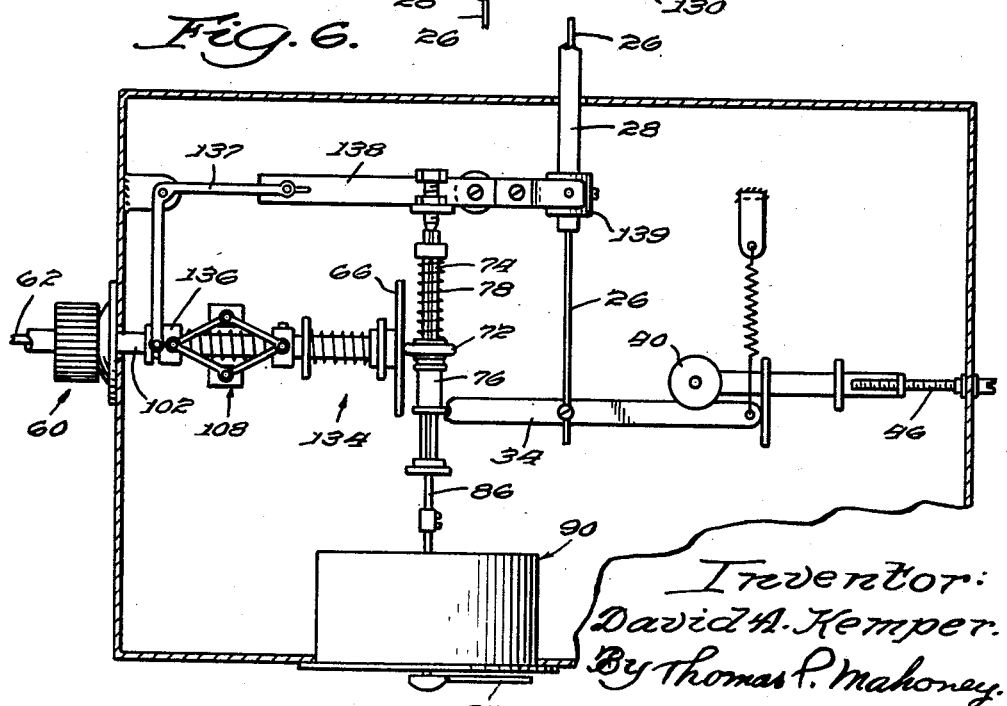
Inventor:
David A. Kemper.
By Thomas P. Mahoney.
Atty.

July 26, 1960
D. A. KEMPER
2,946,219
CONTINUOUSLY INDICATING TORQUE AND HORSEPOWER DEVICE
Filed June 11, 1954
3 Sheets-Sheet 3
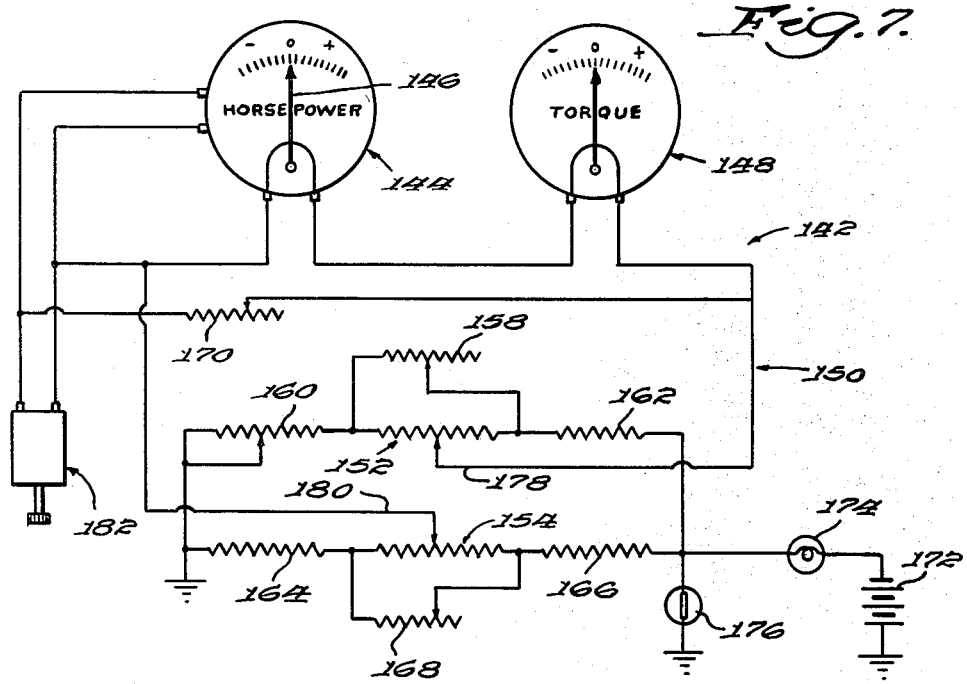
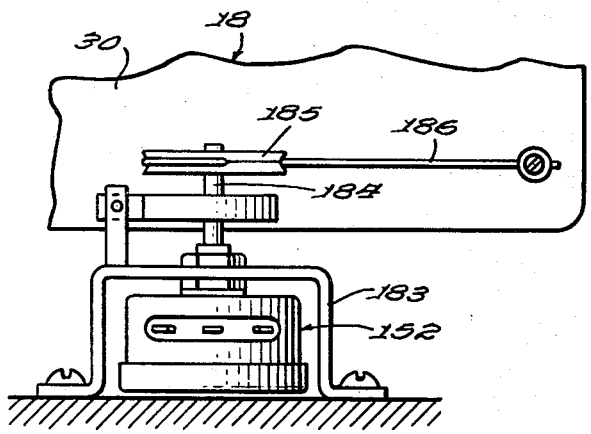
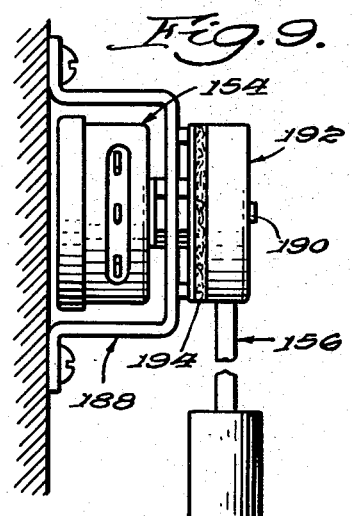
Inventor:
David A. Kemper.
By Thomas P. Mahoney.
Atty.

United States Patent Office 2,946,219
Patented July 26, 1960

2,946,219

CONTINUOUSLY INDICATING TORQUE AND HORSEPOWER DEVICE

David A. Kemper, 513 N. California St., Los Angeles, Calif.

Filed June 11, 1954, Ser. No. 436,179

3 Claims. (Cl. 73—136)

This invention relates to a horsepower indicating device and, more particularly, to a horsepower indicating device adapted to be utilized in conjunction with an internal combustion engine, or other type of engine, in a motor vehicle to determine the road horsepower of the engine and, as a corollary matter, to indicate the torque output of the engine.

Prior art devices of the character here considered usually combine quantities obtained from the mechanical motion of a member such that its departure from a normal position or displacement is proportional to the torque exerted by the engine and a mechanical motion of a member such that its departure from a normal position or displacement is proportional to the speed of the engine or vehicle. Since the quantities are so represented, the mathematical combination of these quantities must be by a multiplication process. Therefore, the resultant quantity obtained by the combination of both quantities previously referred to above is a mechanical motion of a member such that its departure from a normal position or displacement is proportional to the product of speed times torque, which is also proportional to the horsepower developed by the engine.

It is, therefore, an object of the invention to provide a horsepower indicating device wherein the quantities to be combined are the mechanical motion of a member such that its departure from a normal position or displacement is proportional to the torque exerted by the engine and the mechanical motion of a member such that its speed of rotation is proportional to the speed of the vehicle, or that its departure from a reference position is proportional to the distance traveled by the vehicle.

Another object of my invention is the provision of a horsepower indicating device of the aforementioned character wherein a more accurate reading is obtained than is possible by the use of conventional devices.

An additional object of my invention is the provision of a device of the aforementioned character wherein the torque exerted by the engine is obtained through a linkage which is connected directly to the housing of the engine so that the deflection of the engine upon its resilient mounts in the vehicle in which it is located will cause a corresponding movement in the linkage proportional to the torque exerted by said engine.

A further object of my invention is the provision of a device of the aforementioned character wherein the member for sensing the speed of the vehicle or the distance traveled by the vehicle is directly connected to the drive shaft of the vehicle so that the speed of rotation of the member or the departure of said member from a reference position is proportional, respectively, to the speed of the vehicle or to the distance traveled by said vehicle.

One of the major difficulties encountered in the use of prior art devices is the fact that inaccurate readings result due to the loss in the transmission of torque from the engine through the transmission, rear axle, and rear wheels. If the above referred to loss is a constant torque at any speed, the compensation may be realized by a zero adjustment of prior art devices. However, it has been discovered that the torque loss through the above mentioned components of the transmission system varies with the speed.

It is, therefore, an object of my invention to provide a device of the aforementioned character wherein the torque loss through the transminsion system is automatically compensated by incorporating, in conjunction with the member adapted to detect the speed or distance traveled by the vehicle, a compensating means which will modify the signal emitted by said member to an extent proportional to the torque loss detected by said compensating means.

Since the horsepower indicating device of my invention is designed to be utilized in conjunction with internal combustion engines which are mounted upon resilient mounts in vehicles and the torque output of the engines is measured by the deflection of the housing on the mounts, it is necessary to eliminate the complicating effect of gravitational or centrifugal forces upon the housing of the engine during the operation thereof.

It is another object of my invention to provide a device of the aforementioned character wherein the signal transmitted through the aforesaid linkage connected to the housing of the engine is modified in quantity by an additional signal proportional to the gravitational or centrifugal forces exerted upon the housing of the engine by such factors as sharp turns in the road upon which the vehicle is being operated or the canting of the roadbed.

A further object of my invention is the provision of a device of the aforementioned character which includes a first signal emitting means connected to the housing of the engine and adapted to emit a first signal proportional to the deflection of said engine upon its mounts and a second signal emitting means which is connected to the drive shaft of the vehicle in which the engine is located and which is adapted to emit a signal proportional to the speed of the vehicle or the distance traveled thereby, and multiplying means to multiply said signal and provide a function whose product is the desired horsepower reading.

An additional object of my invention is the provision, in a device of the aforementioned character, of a third signal emitting means connected to the second signal emitting means for reducing the signal emitted from said first signal emitting means.

Another object of my invention is the provision, in a device of the aforementioned character, of a fourth signal emitting means adapted to modify the signal emitted by the first signal emitting means.

Other objects and advantages of my invention will be apparent from the following specification and the accompanying drawings which are for the purpose of illustration only and in which:

Fig. 1 shows an embodiment of my invention;

Fig. 2 is a fragmentary view showing the torque loss compensating means of my invention;

Fig. 3 is a vertical, partly sectional view taken on the broken line 3—3 of Fig. 2;

Fig. 4 is a top plan view of the compensating means incorporated in the linkage to the engine housing for compensating for gravitational effects and centrifugal force;

Fig. 5 is a side elevational view taken on the broken line 5—5 of Fig. 4;

Fig. 6 is a view showing the device incorporating an alternative compensating means for compensating for torque loss in the transmission of the vehicle;

Fig. 7 is an alternative embodiment of my invention wherein the various signals are transmitted by electrical devices and the data therefrom is presented upon electric meters;

Fig. 8 is a top plan view of a variable resistor or potentiometer connected to the housing of the engine with which the device is associated; and Fig. 9 is a side elevational view of a variable resistor or rheostat adapted to compensate for centrifugal and gravitational effects exerted upon the housing of the engine.

Referring to the drawings and particularly to Figs. 1–3 thereof, I show a horsepower indicating meter or device 10 which includes first signal emitting means 12 and a second signal emitting means 14 for respectively producing first and second signals which are multiplied by a multiplying means 16 to provide a signal whose product is the horsepower of the engine 18 with which the device 10 is associated. The engine 18 is mounted by means of resilient mounts 20 on the frame 22 of a vehicle, not shown, and is deflected on said mounts to an extent proportional to the torque exerted thereupon.

The bulk of the components of the horsepower indicating device 10 may be encompassed in a housing 23, as best shown in Fig. 1 of the drawings, which, in turn, may be suspended from the dashboard of the vehicle (not shown), or any other convenient location, so that the instruments incorporated therein may be read from the interior of said vehicle.

The first signal emitting means 12 of the presently discussed embodiment of the invention includes a mechanical linkage 24 and incorporates a Bowden wire 26 encompassed in a tubular sheathing 28. One end of the Bowden wire 26 is connected to the block or housing 30 of the engine 18 by means of a clip 32 and the other end of the wire 26 passes through the wall of the housing 23 and is secured to a torque transmitting lever 34. The opposite ends of the tubular sheath 28 are secured to the frame 22 and the housing 23 by means, respectively, of a clip 36 and a fitting 38.

Although the end of the wire 26 is shown as connected to a portion of the housing 30 of the engine 18 adjacent the resilient mountings therefor, it is readily apparent that the end of the wire 26 may be connected to any portion of the housing or block of the engine and, as a matter of fact, I have discovered that it is desirable to achieve greater movement in the wire 26 in some instances and to connect the end of the wire 26 to the top of the housing 30 of the engine 18 to achieve maximum deflection.

The torque transmitting lever 34 is rotatable on a bearing 40 against which it is biased by means of a tension spring 42. The fulcrum of the lever 34 is adjustable and such adjustment is achieved by mounting the bearing on a movable bracket 44 which has an adjustment screw 46 engaged in the end thereof so that, as the adjustment screw is rotated, the bracket is shifted longitudinally to move the bearing 40 mounted thereupon and, thus, the fulcrum of the lever 34 in the desired direction. The bracket 44 and its associated adjustment screw 46 thus constitutes adjustment means for the torque transmitting lever 34 and it is readily apparent that, as the fulcrum of the lever 34 is shifted toward its center, the moment arm thereof is substantially reduced and that, conversely, as the fulcrum is shifted toward the right-hand end thereof, as seen in Fig. 1 of the drawings, the moment arm thereof is materially increased. In this manner the mechanical advantage of the linkage 24 may be adjusted after the device is installed in a vehicle so that the device may be calibrated for said vehicle in which it is installed.

Secured to the left-hand end of the torque transmitting lever 34, as best shown in Fig. 1 of the drawings, is a cable 52 which is connected to the shaft 53 of a torque meter 54 which is mounted in the housing 23. Therefore, when the engine 18 deflects on its resilient mountings 20 during operation, the wire 26 is drawn from the housing 23 to an extent proportional to the extent of the deflection of said engine and the torque transmitting lever 34 is rotated about its fulcrum on the bearing 40 to cause concomitant rotation of the left-hand end of the torque transmitting lever 34 and to draw the cable 52 off the shaft 53 of the torque meter 54, thus providing a torque reading on said meter.

When the engine 18 ceases to operate and returns to its normal position on its resilient mountings 20, the wire 26 is shifted toward the housing 23 and the torque transmitting lever 34 is returned to its neutral position by the action of said wire and the spring 42 and the cable 52 is reeled in upon the shaft 53 of the torque meter 54 to return the torque meter 54 to its normal position by the action of the coil spring 55.

A second signal emitting means 60 is included in the torque indicating device 10 and is connected by means of a flexible shaft 62 to the drive shaft, not shown, of a vehicle. Secured to the end of the flexible shaft 62 is a rotatable shaft 64, said shaft having a rotary member or disc 66 connected thereto. A compression spring 68 interposed between a collar on the shaft 64 and a bracket 70 biases the disc 66 into engagement with a rotatable member 72.

The rotatable member 72 is mounted for rotation with a splined shaft 74 and has an elongated collar 76 located at one side thereof. The end of the collar 76 is engaged by the left-hand end of the torque transmitting lever 34, as best shown in Fig. 1 of the drawings, and is longitudinally shiftable thereby on the splined shaft 74 against the bias of a spring 78 encompassing said shaft. The end of the splined shaft 74 has a bearing 80 secured thereto which is engaged by adjustable bearing screw 82. The opposite end of the splined shaft 74 is connected to the shaft 86 of a horsepower meter 90 to provide a horsepower reading for the engine 18 simultaneously with the torque reading provided on the torque meter 54.

Since the flexible shaft 62 is connected to the drive shaft of the vehicle, it is readily apparent that the rotation or displacement of the rotary member or disc 66 is proportional to the speed of the vehicle or to the extent of displacement of the vehicle from one point to another. Therefore, when the engine 18 is operating and the vehicle is in motion, concomitant rotation of the rotary member or disc 66 and the rotatable member 72 will be accomplished by the engagement of the rotatable member 72 with the rotary member 66. Simultaneously the deflection of the engine 18 on its resilient mounts 20 will cause corresponding deflection of the torque transmitting lever 34 which, by means of its engagement with the collar 76 on the rotatable member 72, causes longitudinal shifting of the rotatable member 72 to an extent proportional to the deflection of the torque transmitting lever 34.

Obviously, the location of the rotatable member 72 with reference to the rotary member or disc 66 determines the speed of the rotatable member 72 since, if the rotatable member 72 is located adjacent the center of the rotary member or disc 66, the speed of rotation will be low; whereas, as the rotatable member 72 is moved outwardly toward the periphery of the rotary member or disc 66, its speed of rotation will be increased to provide a higher horsepower indication on the horsepower meter 90. The rotary member or disc 66, the rotatable member 72, and the torque transmitting lever 34 thus serve as multiplying means for multiplying the first and second signals from the first and second signal emitting means 12 and 60, respectively, so that the function which results on the shaft 86 of the horsepower meter 90 is a function whose product is the desired horsepower. It should be noted at this juncture that the horsepower meter 90 can be constituted by a conventional magnetic-induction speedometer unit with its dial calibrated in horsepower units instead of in miles per hour.

The deflection of the pointer 91 of the horsepower meter 90 is, therefore, proportional to the speed of rotation of the shaft 86 as induced by the concomitant rotation of the splined shaft 74 driven by the rotatable member 72.

It is well known that torque loss is encountered in the transmission of torque from the engine to the drive wheels of a vehicle and such torque loss is responsible for inaccurate horsepower readings in conventional horsepower indicating devices. In order to overcome the inadequacy of prior art devices in this regard, I provide a third signal emitting means 92 which delivers a signal modifying that of the first signal emitting means 12. The third signal emitting means 92 is designed to act as a compensating means for the torque loss encountered in the transmission system between the engine and the drive wheels of the vehicle in which the horsepower indicating device of my invention is installed.

Since the torque loss in the transmission system of such a vehicle is approximately proportional to the speed of the vehicle, the third signal emitting device 92 is connected to the flexible shaft 62 and interposed between said flexible shaft and the rotary member or disc 66.

The third signal emitting means 92 includes a spur gear 94 in mesh with an intermediate gear 96 which is, in turn, engaged with a crown gear 98. An elongated shaft 102 has the rotary member or disc 66 mounted upon the right-hand end thereof, as best shown in Fig. 2 of the drawings, said shaft being journaled intermediate its ends in a traveling block 104 mounted upon slides 106. Mounted on the shaft 102 intermediate its ends is a fly-ball linkage 108 which is centrifugally actuated by the rotation of the shaft 102 to cause longitudinal movement of an associated collar 110.

Connected to the collar 110 is one arm of a bellcrank 112, said bellcrank being pivotally mounted for rotation on an integral extension of the traveling block 104 and having its other arm pivotally connected to a fixed block secured into the housing 23. Therefore, when the shaft 102 is rotated and as the speed thereof increases, the linkage 108 will cause movement of the collar 110 to the left, as best shown in Fig. 2 of the drawings, to cause rotation of the bellcrank 112 and the movement of its point of pivotal connection to the traveling block 104, thus causing concomitant upward movement of the traveling block 104 on the slides 106 proportional to the speed of rotation of the shaft 102 which is, of course, proportional to the speed of rotation of the flexible shaft 62 and its associated vehicle drive shaft, not shown.

Since the traveling block 104 is arranged to move in a direction which would correspond to the same direction in which the rotatable member 72 would move to correspond to an increase in torque of the engine 18, it is obvious that the third signal emitting means 92 serves to cancel, to a certain extent, the signals emitted by the first signal emitting means 12 by an amount proportional to the torque loss encountered in the transmission system the vehicle in which the device 10 of my invention is incorporated. For instance, as the speed of the vehicle increases, the speed of rotation of the shaft 102 will increase proportionally carrying the traveling block 104 upwardly, as best shown in Fig. 2 of the drawings, and serving to nullify, to a certain extent, the effect of the increased torque output of the engine 18 upon the torque transmitting lever 34 which tends to move the rotatable member 72 toward the periphery of the rotary member of disc 66. In this manner, the torque loss from the transmission system of the vehicle is compensated and a more accurate horsepower reading may be obtained at the meter 90.

Since other forces, such as gravitational and centrifugal, cause the housing 30 of the engine to work against its resilient mounts 20, a fourth signal emitting means 112' is provided, as best shown in Figs. 4 and 5 of the drawings. The fourth signal emitting means 112' includes a bellcrank 114 which is pivotally connected to the block 30 of the engine 18 by means of a link 116. The other end of the bellcrank 114 is connected to the Bowden wire 26 and, therefore, the deflection of the engine 18 upon its mounting means 20 is transmitted to the Bowden wire 26 through the bellcrank 114. However, when the vehicle is operating upon a banked ground, or otherwise non-level roadbed, gravitational forces will cause the movement of the engine 18 on the resilient mounts 20 in such a manner as to cause the bellcrank 114 to shift the wire 26 in such a direction as to give an incorrect horsepower reading.

Furthermore, when the vehicle is traveling around curves, centrifugal force will also cause the deflection of the engine 18 on the resilient mounts 20 and cause a corresponding signal to be transmitted through the bellcrank 114 to the end of the wire 26. In order to cancel out these side effects, the fourth signal emitting means 112' has been provided and includes a pivotally mounted lever 118 which is connected to the one end of the tubular sheath 28 encompassing the Bowden wire 26. The opposite end of the tubular sheath is connected to the housing 23 of the device 10, as shown in Fig. 1 of the drawings.

The lever 118 is pivotally mounted for rotation at one end on a bracket 120 and has its opposite end secured to a pin 122 which engages a cam slot 124 in the head 126 of a pendulum 128. Therefore, when the pendulum 128 is caused to swing about its axis of rotation in the head 126, the cam slot 124 will be moved to cause concomitant sideways movement of the pin 122 located therein and thus cause rotation of the lever 118 to shift the end of the cable 28 connected thereto in the appropriate direction to reduce the signal transmitted to the wire 26 by the bellcrank 114 by an amount proportional to the extent the signal from the bellcrank 114 is constituted by side effects due to gravitational or centrifugal deflection of the motor 18 on its resilient mounts 20.

Felt washers 130 engage the head 126 of the pendulum 128 to damp the motion of said pendulum. It should also be noted that the pivotally mounted end of the lever 118 is provided with a plurality of openings 132 which permit the adjustment of the mechanical advantage of the lever 118 on the mounting bracket 120. The sheath 28 of the Bowden wire 26 is secured to the lever 118 by means of pivoted collar 117 and yoke 119 on the lever 118 so that stiffness of the sheath 28 will not influence the motion of the lever 118. The fourth signal emitting means 112' thus serves as a compensation means for the side effects of gravity and centrifugal force imposed upon the engine 18 and thus a more accurate reading is obtained when the fourth signal emitting means is incorporated in the device 10.

An alternative embodiment of the third signal emitting means incorporated in the device 10 of my invention is shown in Fig. 6 of the drawings. The third signal emitting means 134 includes the rotatable shaft 102 and the fly-ball linkage 108 mounted thereupon. However, the linkage 108 is secured to a slidable collar 136 which is pivotally connected to a bellcrank 137. The opposite end of the bellcrank 137 is pivotally engaged in one end of a lever 138, the opposite end of which pivotally mounts a collar 139 which is connected to the adjacent end of the tubular sheath 28 of the Bowden wire 26. Therefore, as the speed of rotation of the shaft 102 increases proportionally to the speed of movement of the drive shaft of the vehicle with which it is connected, the collar 136 is longitudinally shifted on the shaft 102 to rotate the bellcrank 137 to cause concomitant upward movement of the one end of the lever 138 to which said bellcrank is connected and downward movement of the collar 139, thus tending to cancel the torque indication transmitted from the engine 18 through the first signal emitting means 12 to an extent proportional to the torque loss signal which is transmitted through the third signal emitting means 134.

Another embodiment of the invention in electrical form is shown in Figs. 7–9 of the drawings. The electrical embodiment 142 of the invention includes a horsepower meter 144 which is constituted by an electrodynamometer type instrument having two windings, not shown, having the property that the deflection of the pointer 146 of the instrument is proportional to the product of the currents in the two windings. This type of instrument is generally used as a wattmeter wherein the current in a circuit is caused to flow through one winding and a current proportional to the voltage in the circuit is caused to flow in the other winding so that the pointer 146 will present an indication proportional to the product of the current and voltage and thus proportional to the power in the circuit.

The horsepower meter 144 and torque meter 148 are connected in a circuit 150, said circuit including a potentiometer 152 adapted to be rotated by deflection of the motor 18 of the vehicle on its resilient mounts 20 and a potentiometer 154 adapted to be rotated by a pendulum 156. Resistances 158, 160, 162, 164, 166, and 168 are arranged in a Wheatstone bridge circuit in conjunction with the resistances incorporated in the potentiometers 152 and 154. The torque meter 148 is connected to the bridge through its connection to the potentiometer 152 so that when the bridge is balanced, there is no current flow through the meter. The resistance 170 is connected to the output of a generator 182 for introducing a small amount of current proportional to the speed of the vehicle into the torque circuit to compensate for transmission torque loss and, as such, is the equivalent of the third signal emitting means of the previously discussed embodiment of the invention.

The battery 172 of the vehicle provides the energy for the circuit 150 and voltage variation from the battery is eliminated by the use of non-linear resistances 174 and 176. The resistance 174 is constituted by a tungsten filament incandescent lamp whose resistance increases with increased current and the resistance 176 is constituted by a thermistor whose resistance decreases with increasing current. By proper choice of the values of the non-linear resistances 174 and 176, the voltage of the circuit 150 may be maintained substantially constant over a wide voltage range from the battery 172.

The Wheatstone bridge will be balanced when the ratio of the total resistance to the left of the slider 178 in the top arm to the total resistance to the right of the slider 178 is equal to the ratio between the total resistance to the left of the slider 180 in the bottom arm to the total resistance to the right of said slider. Therefore, when the resistances 160 and 162 are made equal and resistances 164 and 166 are made equal, the Wheatstone bridge will be balanced and no indication will be observed on the meters 144 or 148 with the sliders 178 and 180 of the potentiometers 152 and 154 in the centers of their respective travels. With the sliders 178 and 180 in the neutral position, no reading will be presented on the torque or horsepower meters 148 or 144 and the reading will thus correspond to a case of zero torque output from the engine with the vehicle disposed on a level surface.

Resistances 158 and 168 are rheostats to adjust the current flowing in their associated potentiometers 152 and 154, respectively, and thereby to adjust the net effect of said potentiometers in the circuit. Adjustment of either resistance 158 or 168 will have no effect in the neutral position of the sliders 178 and 180 with respect to the potentiometers and thus will control only the degree to which the potentiometers can influence the meter readings and thus will serve as calibration adjustments.

Resistance 160 is variable to balance the bridge in the neutral position and to compensate for slight inaccuracies inherent in the resistances comprising the bridge network. Any of the resistances 160, 162, 164, or 166 can be utilized for this purpose. As the slider 178 of the potentiometer 152 is moved to either side of the center of said potentiometer by deflection of the motor on its mounts, the Wheatstone bridge becomes more or less unbalanced and current flows in the circuit 150 to produce a reading on the torque meter 148. This current flows in one direction for displacement of the slider 178 to one side of the center of the potentiometer 152 and in the other direction for displacement to the opposite side of the center.

For small total displacements of the slider 178, the current output of the bridge is proportional to the extent of travel of the slider 178. For relatively large displacement of the slider 178 from center, the current tends to depart from strict linearity but it can be shown that for a displacement of the slider 178 corresponding to about fourteen percent of the total resistance in the upper arm of the bridge, the departure from linearity is only one percent. Any desired degree of precision in output may be obtained by appropriate limitation of the maximum resistance excursion of the potentiometer 152. This desired result may be achieved by proportioning the ratio between the potentiometer 152 and the resistances 160 plus 162 and/or adjusting the resistance 158.

The same mode or means of adjustment can be applied in the lower arm of the bridge.

Therefore, it can readily be seen that by choosing the proper circuit values the current impressed on the torque meter 148 and, therefore, the deflection of the pointer of said torque meter will be proportional to the torque output of the engine. It is also evident that the potentiometer 152 is the equivalent of the first signal emitting means of the previously discussed embodiment of the invention, while the potentiometer 154 is the equivalent of the fourth signal emitting means of the previously discussed embodiment of the invention whereby the signal from the first signal emitting means is diminished to an extent proportional to the deflection of the engine occasioned by gravitational and centrifugal forces.

A generator 182 connected to the drive shaft of the vehicle has its output connected to the horsepower meter 144 and thus constitutes the equivalent of the second signal emitting means of the previously discussed embodiment of the invention. It is readily apparent that the output of the Wheatstone bridge circuit 150 is modified by the output of the generator 182 so that the second signal from the second signal emitting means may modify the first and fourth signals from the first and fourth signal emitting means. Therefore, when the vehicle is travelling and the engine is operative, a horsepower reading will be presented on the horsepower meter 144 simultaneously with a torque reading on the torque meter 148.

The housing of the potentiometer 152 is mounted adjacent the block 30 of the motor 18 by means of a bracket 183 and the shaft 184 has a pulley 185 connected to the outermost end thereof. Reeved on the pulley 185 is a cable 186, the opposite end of which is connected to the block or housing 30 of the engine 18 so that deflection of the housing or block 30 of the engine 18 will be accompanied by concomitant rotation of the pulley 185 and shaft 184 of the potentiometer 152.

The potentiometer 154, as best shown in Fig. 9 of the drawings, is mounted by means of a bracket 188 and has the head 192 of the pendulum 156 secured to the end of its rotatable shaft 190. A felt pad 194 serves to dampen the rotation of the head 192 on the shaft 190. Therefore, when the pendulum 156 rotates the shaft 190 of the potentiometer 154 to unbalance the bridge 150 in a direction opposite to that in which the bridge is unbalanced by the action of the potentiometer 152, the signal from the potentiometer 154 is opposite to that from the potentiometer 152 and serves to reduce the signal from the potentiometer 152 to an extent proportional to the gravitational and centrifugal effects on the engine 18.

I claim as my invention:

1. In a horsepower indicating device for an internal combustion engine supported in a vehicle by mounts which permit the deflection of said engine when operating, the combination of: torque detecting and transmitting means connected to said engine for generating a signal proportional to the deflection of said engine on its mounts, said torque detecting means being constituted by a potentiometer connected between said vehicle and said engine to measure the torque-induced deflection of said engine with respect to said vehicle; centrifugal force detecting means electrically connected to said torque detecting potentiometer for cancelling that component of said signal from said torque detecting means which is due to the operation of centrifugal force on said engine, said centrifugal force detecting means being constituted by a potentiometer connected to said engine and having a weight connected thereto responsive to centrifugal force; means for detecting and transmitting a signal proportional to the speed of said vehicle connected to the drive shaft thereof and constituted by an electrical generator driven by said drive shaft; and multiplying means connected to said potentiometers and generator for providing a signal proportional to the road horsepower of said engine constituted by a wattmeter connected to the outputs of said electrical generator and said potentiometers.

2. In a horsepower indicating device for an internal combustion engine which is supported in a vehicle by mounts which permit said engine to deflect when operating, the combination of: a first torque detecting potentiometer connected between the housing of said engine and said vehicle for generating a signal proportional to the deflection of said engine on said mounts; a second centrifugal force measuring potentiometer connected to the housing of said engine and energizable by a centrifugal force responsive weight for emitting a signal adapted to alter the output of said first potentiometer either additively or oppositely, said signal from said second potentiometer being proportional to centrifugal and gravitational forces imposed on said housing during the operation of said engine; an electrical generator connected to the drive shaft of said vehicle for generating a signal proportional to the speed of said vehicle; an electrical torque meter connected to said first potentiometer; and an electrical horsepower meter connected to the outputs of said first and second potentiometers and said generator for multiplying the signal from said first and second potentiometers by the signal from said electrical generator to produce a signal proportional to the road horsepower of said engine.

3. In a horsepower indicating device for an internal combustion engine which is supported in a vehicle by mounts which permit said engine to deflect when operating, the combination of: a first torque detecting potentiometer connected between the housing of said engine and said vehicle for generating a signal proportional to the deflection of said engine on said mounts; a second centrifugal force measuring potentiometer connected to the housing of said engine and energizable by a centrifugal force responsive weight for emitting a signal adapted to alter the output of said first potentiometer either additively or oppositely, said signal from said second potentiometer being proportional to centrifugal and gravitational forces imposed on said housing during the operation of said engine; an electrical generator connected to the drive shaft of said vehicle for generating a signal proportional to the speed of said vehicle; an electrical torque meter connected to said first potentiometer; and an electrical horsepower meter connected to the outputs of said first and second potentiometers and said generator for multiplying the signal from said first and second potentiometers by the signal from said electrical generator to produce a signal proportional to the road horsepower of said engine, the output of said second potentiometer being electrically connected through a Wheatstone bridge to the output of said first potentiometer and said generator to produce a signal proportional to road horsepower.

References Cited in the file of this patent

UNITED STATES PATENTS

| Number | Name | Date |
|---|---|---|
| 466,214 | Behr | Dec. 29, 1891 |
| 942,130 | Burt | Dec. 7, 1909 |
| 945,757 | Crowell | Jan. 11, 1910 |
| 955,988 | Osburn | Apr. 26, 1910 |
| 1,000,494 | Clement | Aug. 15, 1911 |
| 2,135,394 | Geissen | Nov. 1, 1938 |
| 2,367,017 | Gardiner | Jan. 9, 1945 |
| 2,426,089 | Fitzgerald | Aug. 19, 1947 |
| 2,680,373 | Bechberger | June 8, 1954 |

FOREIGN PATENTS

| Number | Country | Date |
|---|---|---|
| 546,301 | France | Aug. 17, 1922 |